United States Patent
Date et al.

(10) Patent No.: US 7,626,946 B2
(45) Date of Patent: *Dec. 1, 2009

(54) COMMUNICATION SYSTEM WITH TIMING CYCLE SIMULATION

(75) Inventors: Masaaki Date, Osaka (JP); Yuki Kubo, Osaka (JP); Kosuke Sekiyama, Fukui (JP)

(73) Assignee: Oki Electric Industry Co., Ltd., Tokyo (JP)

(*) Notice: Subject to any disclaimer, the term of this patent is extended or adjusted under 35 U.S.C. 154(b) by 597 days.

This patent is subject to a terminal disclaimer.

(21) Appl. No.: 11/287,223

(22) Filed: Nov. 28, 2005

(65) Prior Publication Data
US 2006/0114840 A1 Jun. 1, 2006

(30) Foreign Application Priority Data
Nov. 29, 2004 (JP) .............................. 2004-344641

(51) Int. Cl.
*H04L 12/28* (2006.01)
*H04J 3/06* (2006.01)
(52) U.S. Cl. ...................... 370/254; 370/516; 370/350; 370/503; 703/16; 395/500
(58) Field of Classification Search ................. 370/255, 370/350, 230, 503, 507; 373/242, 356; 703/13; 395/500
See application file for complete search history.

(56) References Cited

U.S. PATENT DOCUMENTS

| 5,649,164 A | * | 7/1997 | Childs et al. ................... 703/16 |
| 2001/0024455 A1 | * | 9/2001 | Thaler et al. ................. 370/503 |
| 2002/0136198 A1 | * | 9/2002 | Findikli ...................... 370/350 |

OTHER PUBLICATIONS

U.S. Appl. No. 10/939,489, filed Sep. 1, 2005, Date, Masaaki.
U.S. Appl. No. 11/217,376, filed Mar. 9, 2006, Date, Masaaki.
Waiyaresu LAN Akitekucha (Wireless LAN Architecture) edited by Matsushita et al., Kyoritsu Shuppan, 1996, pp. 47, 53-59, 69.

\* cited by examiner

*Primary Examiner*—Dang T Ton
*Assistant Examiner*—Mohamed Kamara
(74) *Attorney, Agent, or Firm*—Venable LLP; Michael A. Sartori; Kyle D. Petaja (57) ABSTRACT

Each node in a communication system operates on a repetitive internal timing cycle, at certain phases in which the node transmits data and state variable signals. The state variable signals indicate the node's data transmission timing. Each node has a virtual node calculator that simulates the timing cycles of neighboring nodes according to the state variable signals received from those nodes, and a phase calculator that varies the phase state of the node according to the simulated phase states of the neighboring nodes. Neighboring nodes can therefore interact continuously, even though they transmit state variable signals only intermittently. Consequently, a group of neighboring nodes can autonomously establish and maintain transmission time slots of equal length.

18 Claims, 7 Drawing Sheets

FIG.4

COMMUNICATION SYSTEM WITH TIMING CYCLE SIMULATION

BACKGROUND OF THE INVENTION

1. Field of the Invention

The present invention relates to a communication control apparatus, a communication control method, a node, and a communication system.

2. Description of the Related Art

Known methods by which a plurality of spatially distributed nodes can transmit data without collisions include time division multiple access (TDMA) and carrier sense multiple access (CSMA), the latter including carrier sense multiple access with collision avoidance (CSMA/CA) and carrier sense multiple access with collision detection (CSMA/CD). A discussion of these methods can be found in, for example, *Waiyaresu LAN Akitekucha* (Wireless LAN Architecture), edited by Matsushita and Nakagawa, Kyoritsu Shuppan, 1996, pp. 47, 53-59, and 69 (in Japanese).

A weakness of the TDMA system is that if the central administrative node that assigns time slots malfunctions, the entire communication system may be brought down. Various collision avoidance methods in which the individual nodes adjust their time-slot assignments autonomously, without the need for a central administrative server, have therefore been proposed, as in Japanese Patent Applications No. 2003-328530, No. 2004-257562, and No. 2004-257567. In these proposed systems, each node interacts with its neighboring nodes by transmitting impulse signals at regular intervals and adjusting the timing of these intervals according to the timing of the impulse signals received from the neighboring nodes, using a nonlinear model that forces the transmission timing away from the receiving timing. A group of interacting nodes can thereby establish non-overlapping time slots in which to transmit data without collisions.

Also disclosed in the above Patent Applications are similar systems in which the nodes interact continuously instead of interacting at discrete intervals, by continuous transmission of phase signals between nodes, and thereby autonomously acquire discrete time slots.

Systems in which the nodes interact continuously by transmitting phase signals can communicate more efficiently than systems in which the nodes interact by transmitting impulse signals at discrete intervals, because nodes in the former type of system can adjust their communication timing continuously, whereas a node in the latter type of system adjusts its communication timing only when it receives an impulse signal from another node. More specifically, in a system in which interaction takes place by impulse signals, the time slots obtained by mutually adjacent nodes tend to differ in length, which impedes efficient communication when, for example, a node relays data between two other nodes. As a result, the efficiency of utilization of the network is reduced.

SUMMARY OF THE INVENTION

An object of the present invention is to provide a communication control apparatus, a communication control method, a node, and a communication system that can improve network utilization efficiency by enabling mutually neighboring nodes to obtain substantially equal time slots.

The invention provides a timing control apparatus that can be installed in each of a plurality of nodes constituting a communication system. The timing control apparatus operates on a repetitive internal timing cycle, at certain phases in which the node transmits data and state variable signals. The state variable signals give information about the node's data transmission timing. In the timing control apparatus, a communication timing calculator derives the phase state of the internal timing cycle and thereby determines the data transmission timing. The communication timing calculator includes a virtual node calculator and a phase calculator.

The virtual node calculator calculates a virtual phase state of a neighboring node according to state variable signals received from that node.

The phase calculator varies the phase state of its own node according to reception of the state variable signals from the neighboring node and the virtual phase state of the neighboring node calculated by the virtual node calculator, following a predetermined time series rule.

This method of communication control enables two nodes to interact on a continuous basis by calculating each other's virtual phases, even though they transmit state variable signals only intermittently. As a result, a group of neighboring nodes can establish and maintain transmission time slots of substantially equal length. This efficient state is reached without the need for timing instructions from a central administrative node.

The invention also provides a node including the invented communication control apparatus, and a communication system including a plurality of such nodes.

DETAILED DESCRIPTION OF THE INVENTION

Embodiments of the invention will now be described with reference to the attached drawings, in which like elements are indicated by like reference characters.

FIRST EMBODIMENT

Figure 1:
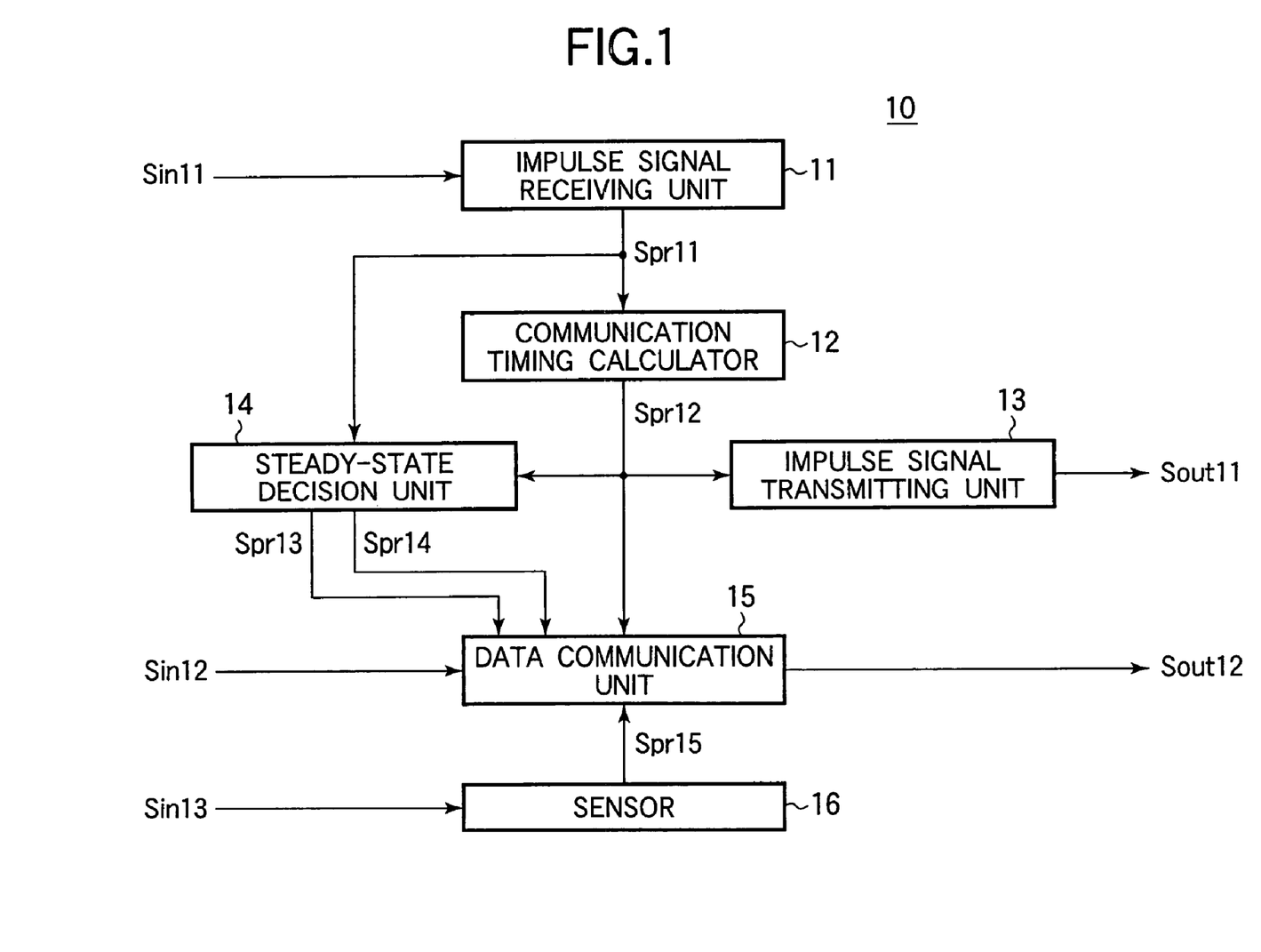
FIG. 1 is a functional block diagram of a node in first, second, and third embodiments of the invention.

Referring to FIG. 1, each node 10 in the first embodiment comprises an impulse signal receiving unit 11, a communication timing calculator 12, an impulse signal transmitting unit 13, a steady-state decision unit 14, a data communication unit 15, and a sensor 16. The impulse signal receiving unit 11, communication timing calculator 12, impulse signal transmitting unit 13, and steady-state decision unit 14 combine to function as a communication control apparatus.

The impulse signal receiving unit 11 receives input impulse signals Sin11 transmitted by neighboring nodes. Two nodes are considered to be neighboring if they are within receiving range of each other's impulse signals. An impulse signal is a timing signal and may have, for example, a Gaussian waveshape. The impulse signal receiving unit 11 outputs received impulse signals Spr11, which it may obtain by reshaping or regenerating the input impulse signals Sin11.

The communication timing calculator 12 calculates the value of a phase signal Spr12 by which the communication timing of the node is regulated, cycling the phase value at a basically constant rate but with adjustments according to the received impulse signals Spr11. The phase signal Spr12 at the i-th node will also be denoted $\theta_i(t)$ below, where t represents time. The adjustments are carried out according to a nonlinear rule that drives mutually interacting nodes out of phase with each other.

Figure 2A:
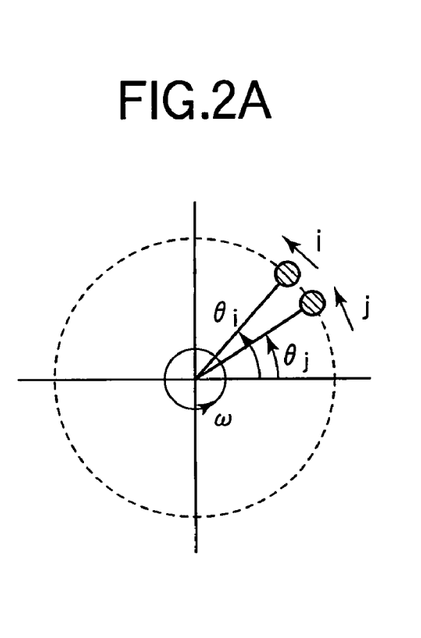
FIG. 2A illustrates an initial state during communication among two nodes in the first, second, and third embodiments.
Figure 2B:
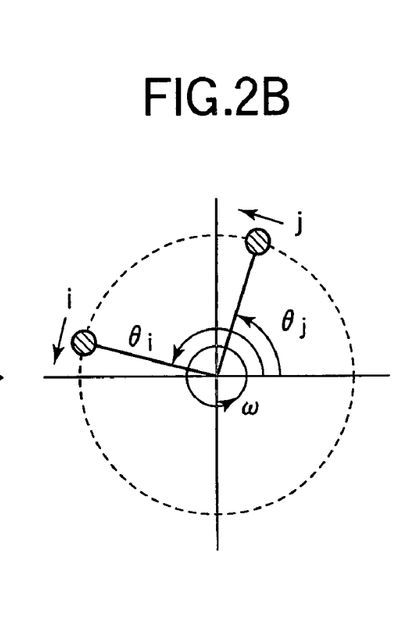
FIG. 2B illustrates a transitional state during communication among the two nodes.
Figure 2C:
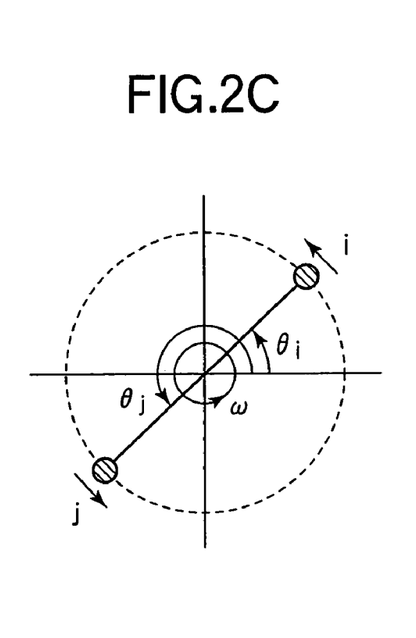
FIG. 2C illustrates the steady state during communication among the two nodes.

FIGS. 2A, 2B, 2C, 2A, 2B, and 2C show two simplified examples of the adjustment process.

In FIGS. 2A, 2B, and 2C, just one neighboring node j interacts with the node of interest i. FIG. 2A shows an exemplary initial state. Timing is modeled by the motion of two point masses rotating at a basic angular velocity expressed by a natural angular frequency parameter ω around a circle that expresses the communication timing of nodes i and j as phase values $\theta_i(t)$, $\theta_j(t)$. If the rotational motion of a point mass is projected onto the vertical axis or horizontal axis, the motion of the projected point exhibits a harmonic nonlinear oscillation or rhythm. The two nodes interact by transmission and reception of output impulse signals (Sout11, Sin11), adjust their angular velocities as a result of the interaction, and reach a steady state in which a complementary phase relationship is maintained. This process can be understood as operating by mutual repulsion of the two point masses as they rotate. More specifically, the communication timing calculator 12 at each node alters (quickens or slows) the timing phase velocity of its own node so as to move the timing phase gradually away from the timing phase of the other node. With elapse of time the initial state in FIG. 2A passes through a transitional state such as the one in FIG. 2B and finally settles into the steady state shown in FIG. 2C, in which the two nodes operate with opposite timing phase (a phase difference of π radians) and can transmit non-colliding output impulse signals and data.

Figure 3A:
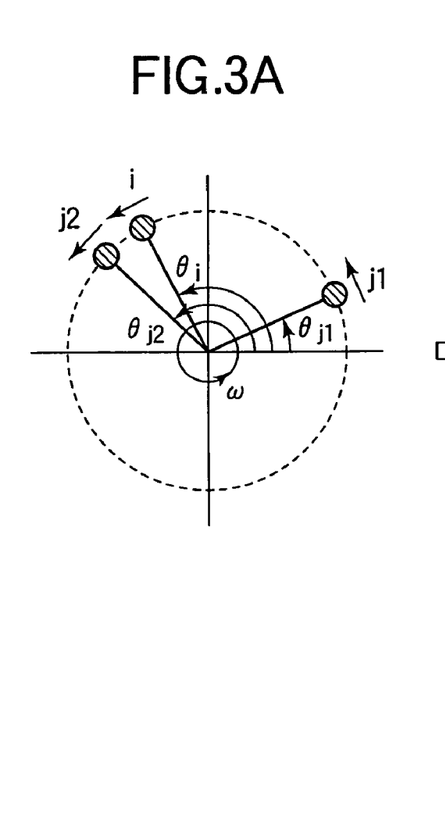
FIG. 3A illustrates an initial state during communication among three nodes in the first, second, and third embodiments.
Figure 3B:
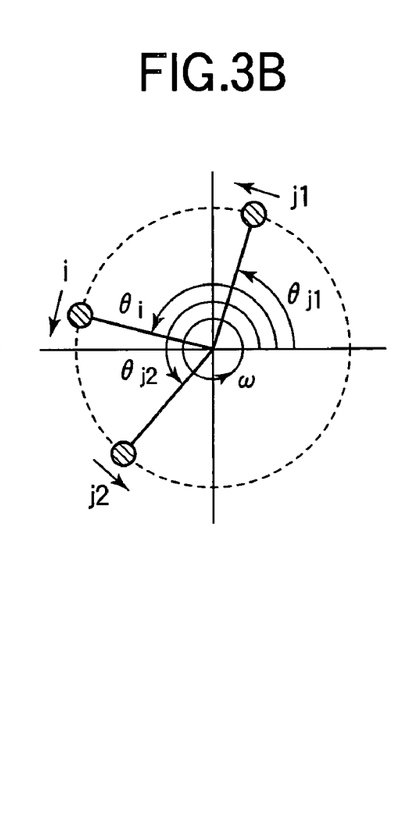
FIG. 3B illustrates a transitional state during communication among the three nodes.
Figure 3C:
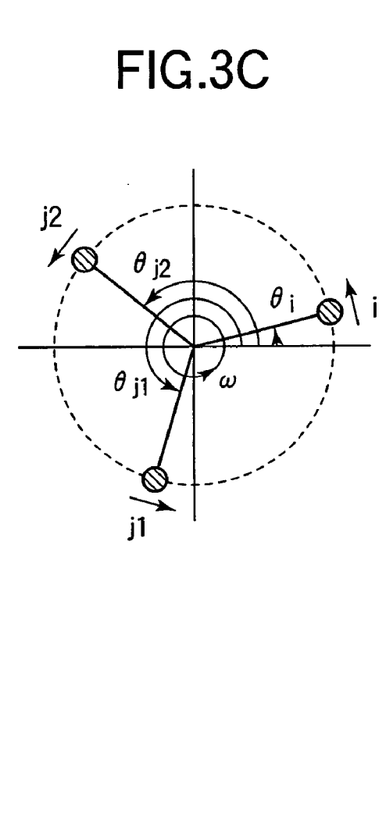
FIG. 3C illustrates the steady state during communication among the three nodes.

In FIGS. 3A, 3B, and 3C two nodes j1 and j2 interact with the node of interest i. FIG. 3A shows an exemplary initial state, FIG. 3B shows a transitional state, and FIG. 3C shows the steady state in which the phases at the three nodes are maximally separated.

If the number of interacting nodes changes during the course of system operation, the steady state changes adaptively. For example, if two interacting nodes have established a stable phase relationship as in FIG. 2C and then a third node joins the interaction, the stability of the phase relationship is destroyed, but after passing through a transitional state, the system assumes a new steady state like the one in FIG. 3C. Similar adaptation occurs when a node is removed or stops functioning.

Referring again to FIG. 1, the communication timing calculator 12 outputs the first phase signal Spr12 or $\theta_i(t)$ to the impulse signal transmitting unit 13, steady-state decision unit 14, and data communication unit 15.

The impulse signal transmitter 13 transmits the output impulse signal Sout11 according to the phase signal Spr12. More specifically, it transmits an output impulse signal Sout11 each time the phase signal Spr12 takes on a specific value $\alpha$ ($0 \leq \alpha \leq 2\pi$. A single value of $\alpha$ is preferably set for the entire system: in the following description it will be assumed that $\alpha=0$ uniformly throughout the system. In the example in FIG. 3C, in which nodes i and j operate π radians out of phase, the timing of the output impulse signals Sout11 transmitted from node i is π radians out of phase with the timing of the output impulse signals Sout11 transmitted from node j.

The steady-state decision unit 14 decides whether the transmission timings of the output impulse signals Sout11 at its own node and neighboring nodes are in a transitional state (as in FIG. 2B or 3B) or a steady state (as in FIG. 2C or 3C). The steady-state decision unit 14 observes the timing of the received impulse signals Spr11 (corresponding to output impulse signals Sout11 transmitted by other nodes) and the output impulse signals Sout11 transmitted by its own node, and decides that they are in the steady state if the timing differences are stable. In the present embodiment, the steady-state decision unit 14 recognizes the output timing of output impulse signals Sout11 at its own node by receiving the phase signal Spr12 instead of the output impulse signal. The steady-state decision can be made, for example, as follows.

(a) The value β of the phase signal Spr12 at the timing of occurrence of each received impulse signal Spr11 is observed for one basic cycle of the phase signal Spr12. Let the values β of the phase signal Spr12 obtained as a result of performing the above observation be:

$$\beta_1, \beta_2, \ldots, \beta_N \ (0<\beta_1<\beta_2<\ldots<\beta_N<2\pi)$$

(b) The differences (phase differences) Δ between adjacent values are calculated from the observed values β of the phase signal Spr12.

$$\Delta_1=\beta_1, \Delta_2=\beta_2-\beta_1, \ldots, \Delta_N=\beta_N-\beta_{N-1}$$

(c) Processes (a) and (b) above are carried out at intervals of one cycle of the phase signal Spr12 and the rate of change γ (differences) in the phase difference Δ between adjacent cycles are calculated.

$$\gamma_1=\Delta_1(\tau+1)-\Delta_1(\tau), \gamma_2=\Delta_2(\tau+1)-\Delta_2(\tau), \ldots, \gamma_N=\Delta_N(\tau+1)-\Delta_N(\tau)$$

where τ indicates discrete time in units of one cycle of the phase signal Spr12.

The steady state is recognized when the above rates of change γ are all smaller than a predetermined value ε.

$$\gamma_1<\epsilon, \gamma_2<\epsilon, \ldots, \gamma_N<\epsilon$$

It is also possible, however, to make the steady state decision according to whether the decision condition $$\gamma_1<\epsilon, \gamma_2<\epsilon, \ldots, \gamma_N<\epsilon$$

is satisfied over M cycles (where M is an integer greater than two). The larger the value of M is, the more stable the state must be in order for the steady-state decision unit 14 to decide that the steady state has been reached. Alternatively, the decision may be based on only some of the received impulse signals.

At intervals equal to one cycle of the phase signal Spr12, the steady-state decision unit 14 sends the data communication unit 15 a steady-state decision signal indicating the decision result, and a slot signal equal to the first observed phase value $\beta_1$ in the current cycle of the phase signal $\theta_i(t)$. Use of the first observed phase value $\beta_1$ is related to the condition $\alpha=0$ given above. If a different value of $\alpha$ is selected, a different β may be used.

The sensor 16 senses a property of the physical environment of the node, such as sound pressure, vibration, chemical concentration, temperature, or any other measurable property. The sensed property acts as an input signal Sin13, from which the sensor 16 generates observation data Spr15. The sensor 16 sends the observation data Spr15 to the data communication unit 15. The data communication unit 15 also receives the output data signals Sout12 transmitted by neighboring nodes as input data signals Sin12.

The data communication unit 15 transmits the observation data Spr15 or the input data signal Sin12 (or both) to other nodes as an output data signal Sout12. The output data signal Sout12 is transmitted when the steady-state decision signal Spr13 indicates that the steady state has been recognized, and is not transmitted when the steady-state decision signal Spr13 indicates a transitional state. The output data signal Sout12 and output impulse signal Sout11 are transmitted in the same frequency band. The output data signal Sout12 is transmitted in a time slot (time interval) described below. The term 'time slot' will be used even though it does not denote a fixed time interval allocated by the system.

A time slot is the interval in which the phase $\theta_i(t)$ indicated by the phase signal Spr12 satisfies the following condition.

$$\delta_1 \leq \theta_i(t) \leq \beta_1 - \delta_2$$

The time slot starts when transmission of the output impulse signal Sout11 has ended, at which point the value of the phase signal is $\delta_1$. The time slot ends at a time preceding the timing of the first received impulse signal Spr11 in each cycle of the phase signal Spr12 by an offset $\delta_2$, at which point the value of the phase signal is $\beta_1 - \delta_2$. The parameters $\delta_1$ and $\delta_2$ are phase angles corresponding to short periods of time which need only be adequate to assure that impulse signals (transmitted by the node 10 or another node) and data signals (transmitted by the node 10 or another node) do not occupy the wireless space around the node 10 simultaneously. The values of $\delta_1$ and $\delta_2$ may be determined experimentally under actual operating conditions.

In FIG. 3C, for example, node i starts transmitting an output impulse signal Sout11 when its phase $\theta_i$ is zero, completes transmission of the output impulse signal Sout11 before phase $\theta_i$ reaches $\delta_1$, starts transmitting an output data signal Sout12 when phase $\theta_i$ is equal to $\delta_1$, and completes the transmission of the output data signal Sout12 when phase $\theta_i$ is equal to $\beta_1 - \delta_2$ (where $\beta_1 \approx \pi$). Node i, then halts transmission of output impulse signals Sout11 and output data signals Sout12 until the phase $\theta_i$ reaches zero again. Node j operates in similar fashion, based on its own phase $\theta_j$. Since phase $\theta_i$ and phase $\theta_j$ differ by substantially $\pi$ radians, the transmissions do not collide. Similar non-colliding transmission is carried out when there are three nodes or more.

The output data signals Sout11 transmitted by node 10 may be used either to relay data (Sin12) received from another node or to transmit data (Sin13) originating at node 10. The sensor 16 is shown as one example of a means for generating data originating at node 10.

The operation of the communication timing calculator 12 will now be described in more detail.

Figure 4:
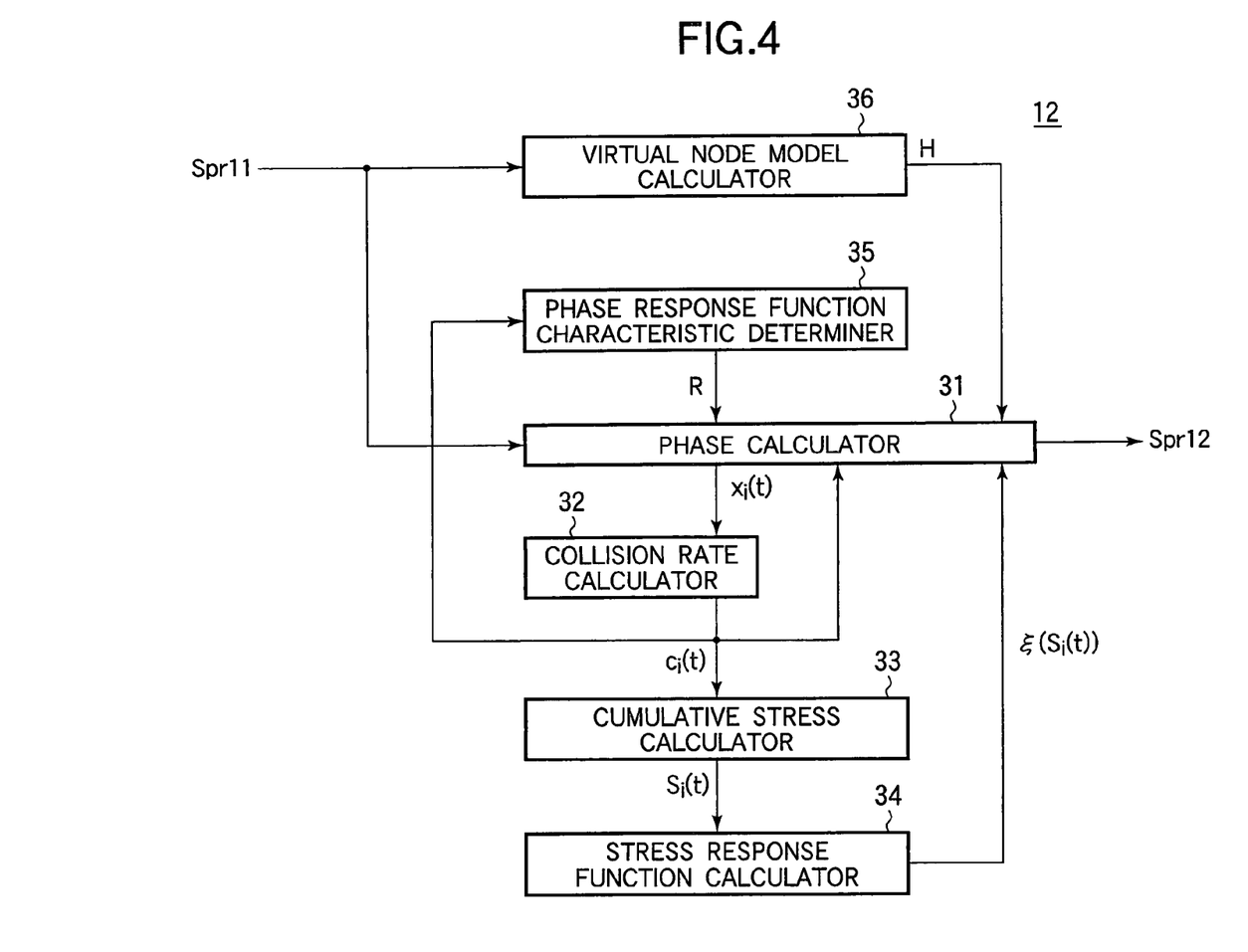
FIG. 4 is a block diagram showing the structure of a communication timing calculator in a first embodiment of the invention.

Referring to FIG. 4, the communication timing calculator 12 comprises a phase calculator 31, a collision rate calculator 32, a cumulative stress calculator 33, a stress response function calculator 34, a phase response function characteristic determiner 35, and a virtual node model calculator 36.

The virtual node model calculator 36 receives a received impulse signal Spr11, representing an output impulse signal Sout11 transmitted from a neighboring node, generates a virtual phase model, uses the virtual phase model to simulate the timing phase of the neighboring node for one timing cycle, and supplies the simulated phase values to the phase calculator 31. The communication timing calculator 12 then operates as if it were interacting continuously with the neighboring node during the timing cycle for which simulation lasts. At approximately the end of this timing cycle, the neighboring node can be expected to transmit a new impulse signal, from which a new virtual phase model will be generated, enabling the simulation of the neighboring node to continue.

Figure 5:
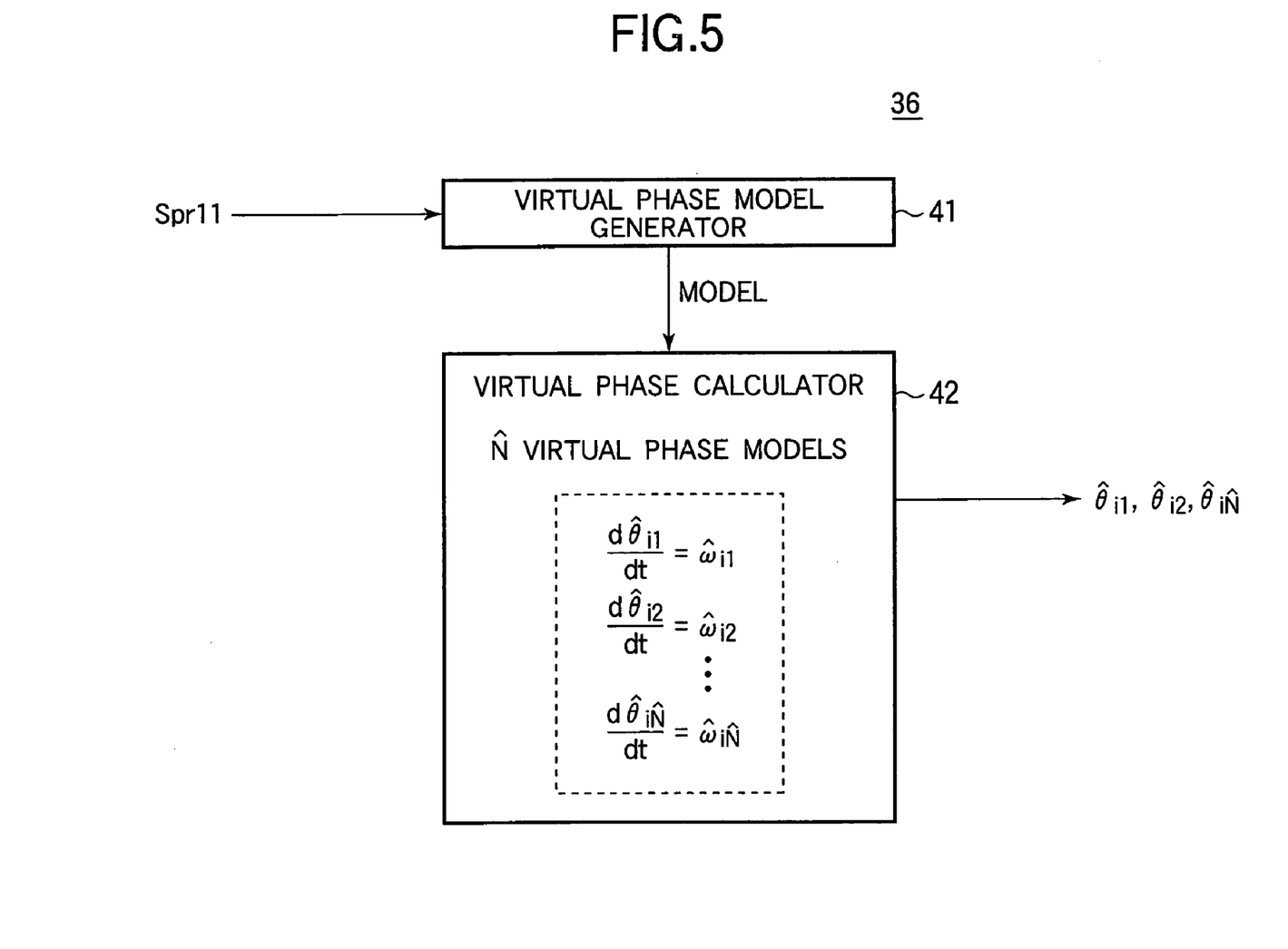
FIG. 5 is a functional block diagram of the virtual node model calculator in the first embodiment.

Referring to FIG. 5, the virtual node model calculator 36 comprises a virtual phase model generator 41 and a virtual phase calculator 42.

The virtual phase model generator 41 receives the received impulse signal Spr11, generates a virtual phase state model, sets the initial timing phase of the virtual phase model to the timing phase represented by the received impulse signal, and passes the virtual phase model to the virtual phase calculator 42. Each time an impulse signal is received, the virtual phase model generator 41 generates a new virtual phase model.

The virtual phase model generated by the virtual phase model generator 41 is a mathematical model simulating the phase state of a node j. One of the simplest models is expressed by the following equation (1), in which d/dt represents differentiation:

$$\frac{d\Theta_{ij}}{dt} = \Omega_{ij} \tag{1}$$

$\Theta_{ij}$ represents the simulated timing phase of node j as modeled at node i; the possible range of values is:

$$0 \leq \Theta_{ij} < 2\pi$$

$\Omega_{ij}$ represents the natural angular frequency parameter of node j as modeled at node i. In the simplest case, the natural angular frequency parameter $\Omega_{ij}$ has the same value as the natural angular frequency parameter $\omega_i$ of node i. A prerequisite in this case is that the natural angular frequency parameter $\omega_i$ has a uniform value throughout the system.

Node i does not know the identity of node j. Accordingly, it is possible that node i may occasionally operate two virtual phase models for the same neighboring node. This occurs if the neighboring node transmits two impulse signals separated by an interval shorter than the length of the simulated timing cycle at node i.

Equation (1) means that the virtual phase $\Theta_{ij}$ of neighboring node j can be calculated by using a mathematical model (time series rule) expressing an oscillatory phenomenon with a fixed rhythm given by the virtual natural angular frequency parameter $\Omega_{ij}$.

If every node transmits an impulse signal at a predetermined timing phase $\Psi$ (corresponding to a of the impulse signal transmitting unit 13 described earlier), the initial phase (initial value) for calculating the virtual phase $\Theta_{ij}$ may be set uniformly to $\Psi$. In the subsequent description of the present embodiment, the phase $\Psi$ is assumed without loss of generality always to be zero.

The computation expressed by equation (1) may be executed digitally by software running on a processor at the node 10, by using a difference equation (recursion formula) obtained by breaking up the continuous time variable t of a differential equation into discrete time, or in analog form by hardware, by equipping the node 10 with an electronic circuit that operates as described by equation (1).

The virtual phase calculator 42 receives each virtual phase model generated by the virtual phase model generator 41, calculates virtual phase states in accordance with the virtual phase model, and sends the calculated virtual phase values to the phase calculator 31. If N^ is the number of virtual phase models currently operating at node i, the phase calculator 31 receives phase information for N^ presumed neighboring nodes j (j=1, 2, . . . N^).

Since the virtual phase model generator 41 generates a new virtual phase model each time an impulse signal is received from node j, without further control, redundant virtual phase models of the same neighboring node would accumulate with the passage of time. The virtual phase calculator 42 of the present embodiment accordingly retains the virtual phase model received from the virtual phase model generator 41 for one cycle and then deletes it, at the point at which the simulated phase returns to the initial value Ψ. Under the above assumption (Ψ=0), the time evolution of the virtual phase $\Theta_{ij}$ starts at the initial phase of zero and ends at a phase of 2π.

When the virtual phase calculator 42 deletes the j-th virtual phase model, it stops sending virtual phase values $\Theta_{ij}$ to the phase calculator 31. Because the neighboring node being modeled transmits impulse signals periodically, however, a new virtual phase model of the same neighboring node will be generated when another impulse signal is received from that node. Normally, this will happen at about the time when the previous virtual phase model of the node is deleted. The virtual phase model of the node is accordingly updated approximately once per timing cycle, at which point the difference between the actual phase of the neighboring node and the phase $\Theta_{ij}$ simulated at node i is reduced to zero. This prevents the simulation error from becoming large.

The other internal functions of the communication timing calculator 12 will be described with reference to FIG. 4.

The communication timing calculator 12 determines a transmission timing according to equations such as (2) and (3) expressing a nonlinear oscillation model.

$$\frac{d\theta_i(t)}{dt} = \omega_i + \frac{K}{Ni}\sum_{j=1}^{\tilde{N}_i} R(\Delta\Theta_{ij}(t)) + \xi(S_i(t)) \quad (2)$$

$$\Delta\Theta_{ij}(t) = \Theta_{ij}(t) - \theta_i(t) \quad (3)$$

Equations (2) and (3) represent a rule for temporally varying the nonlinear oscillation rhythm of node i in response to the input of received impulse signals Spr11, which is obtained by receiving an output impulse signal transmitted by a neighboring node in the mutual interaction range.

In equations (2) and (3), variable t represents time, and function $\theta_i(t)$ represents the phase of the nonlinear oscillation of node i at time t. A modulo 2π value is taken, by taking the remainder of $\theta_i(t)$ divided by 2π so that the value is always within the following range:

$$0 \leq \theta_i(t) < 2\pi$$

$\Delta\Theta_{ij}(t)$ is a phase difference obtained by subtracting the phase $\theta_i(t)$ of local node i from the virtual phase $\Theta_{ij}(t)$ of neighboring node j. For the sake of convenience, a modulo 2π value is taken by taking the remainder, when divided by 2π, of the sum of the phase difference $\Delta\Theta_{ij}(t)$ and 2π, bringing the value of $\Delta\Theta_{ij}(t)$ within the following range:

$$0 \leq \Delta\Theta_{ij} < 2\pi$$

The natural angular frequency parameter $\omega_i$ represents the basic rhythm of the node. Here, $\omega_i$ is assumed to have a fixed uniform value throughout the system.

$R(\Delta\Theta_{ij}(t))$ is a phase response function representing the variation of the oscillation rhythm of node i in response to phase difference $\Delta\Theta_{ij}(t)$. $R(\Delta\Theta_{ij}(t))$ has a nonlinear characteristic to that pushes the phase $\theta_i(t)$ of node i away from the virtual phase $\Theta_{ij}(t)$ of node j. N^i in the term including the phase response function $R(\Delta\Theta_{ij}(t))$ represents the total number of virtual phase models in use at time t, and K is a coupling constant parameter. The coupling constant parameter K determines the level of contribution of the term including $R(\Delta\Theta_{ij}(t))$ to the temporal evolution of the phase; the value of this coupling constant can be determined experimentally.

The function $\xi(S_i(t))$ produces a phase shift of random magnitude responsive to a stress function $S_i(t)$ that accumulates stress when the relative phase difference between the i-th node and a j-th node is small. The relative phase difference is defined as a quantity E calculated from the phase difference $\Delta\Theta_{ij}(t)$ by the following rule:

If $\Delta\Theta_{ij}(t) \leq \pi$ then $E = \Delta\Theta_{ij}(t)$ \quad (4)

If $\Delta\Theta_{ij}(t) > \pi$ then $E = 2\pi - \Delta\Theta_{ij}(t)$ \quad (5)

The function $\xi(S_i(t))$ represents a response to cumulative stress, and will be referred to below as a stress response function.

One feature of the first embodiment is that, even if there is no central administrative node, the nodes can determine their own time slot assignments in an autonomous and distributed manner by interacting with their neighboring nodes and modifying their phase signals through use of a nonlinear oscillation model. Another feature is the inclusion of the stress response function $\xi(S_i(t))$ in the nonlinear oscillation model to avoid a situation in which a node becomes stabilized in a steady state even though the phase difference between the node and a neighboring node is extremely small.

Specific examples of the phase response function $R(\Delta\Theta_{ij}(t))$ and the stress response function $\xi(S_i(t))$ will now be given. The description will begin with definitions of the terms 'data transmission collision', 'time-based collision rate', and 'count-based collision rate'.

Data Transmission Collision

Let $\phi_c$ be the phase width corresponding to the width $W_{min}$ of the smallest time slot that a node needs in order to transmit data. The phase width can be calculated as the product of $W_{min}$ and the natural angular frequency parameter ω ($\phi_c = W_{min} \cdot \omega$). The width $W_{min}$ is a constant parameter that is determined according to the application.

A data transmission collision is defined to have occurred when the relative phase difference between a first node and a second node within impulse signal receiving range of the first node is less than the above phase width $\phi_c$. A data transmission collision therefore occurs when the relative phase difference is less than phase width $\phi_c$ for even one received impulse signal Spr11.

Time-Based Collision Rate

Let $x_i(t)$ be a function expressing the occurrence or non-occurrence of a data transmission collision at node i. This function $x_i(t)$ is defined by the following equation (7), which means that $x_i(t)$ takes the value '1' if a collision occurs at time t and the value '0' otherwise ('else').

$$\begin{aligned} x_i(t) &= 1 \quad \text{collision} \\ x_i(t) &= 0 \quad \text{else} \end{aligned} \quad (6)$$

-continued $$y_i(t) = \int_{t-n \cdot T_i}^{t} x_i(\tau) d\tau \qquad (7)$$

$$c_i(t) = \frac{\omega_i \cdot y_i(t)}{n \cdot \phi_c} \qquad (8)$$

The cumulative collision time $y_i(t)$ over n timing cycles, where n is a positive integer, is defined by equation (8); that is, it is obtained by integrating the function $x_i(t)$ over n cycles up to time t. The quantity $T_i$ in equation (8) represents the length of the timing cycle at node i. The cumulative collision time $y_i(t)$ is the total length of time in the n cycles up to time t during which the function $x_i(t)$ takes the value '1', and can be calculated by observing the value of the function $x_i(t)$.

The value $c_i(t)$, which is equal to $y_i(t)$ normalized by the maximum cumulative collision time, expresses the proportion of the time in the n cycles during which collisions occurred. The maximum cumulative collision time is the maximum possible value of the cumulative collision time $y_i(t)$. If each node is assumed to transmit using time slots of width $W_{min}(=\phi_c/\omega_i)$, the maximum cumulative collision time during n cycles is $n \cdot W_{min}(=n \cdot \phi_c/\omega_i)$. The collision rate $c_i(t)$ is therefore defined as in equation (9).

Because the phase θ of each node is varied according to formula (2), the period $T_i$ may take different lengths in different cycles. The cumulative collision time $y_i(t)$ may therefore exceed the maximum collision time $n \cdot W_{min}$; that is, the collision rate $c_i(t)$ may exceed '1'. When the collision rate $c_i(t)$ exceeds '1', it is set equal to '1'.

The preceding exemplary definition of the collision rate ignores the possibility of multiple collisions occurring simultaneously. The method of defining collisions, however, is not limited to the method above. It is possible to use a method that takes multiple simultaneous collisions into account. It is also possible to calculate the collision rate by counting collisions instead of calculating the total collision time.

Count-Based Collision Rate

This method counts the number of timing cycles in which collisions occur. If multiple collisions occur during the same cycle, they are counted as one collision, because only the presence or absence of collisions is considered.

Let γ be the cumulative number of collisions in n cycles; that is, the number of cycles in which collisions occur. The count-based collision rate $c_i(t)$ is defined as the cumulative number of collisions γ normalized by the maximum possible number of collisions (n, representing a collision in every cycle), and is therefore calculated from the following equation (9).

$$c_i(t) = \gamma/n \qquad (9)$$

The collision rate calculated from equation (10), like the collision rate calculated from equation (9), may exceed '1'. As before, a collision rate exceeding '1' is treated as being equal to '1'. Counting multiple collisions occurring in the same cycle as a single collision is furthermore only one example of the counting method; it is possible to count each collision separately.

The definition of the collision rate can be generalized by using the term 'amount of collision' to denote either the time-based or the count-based quantity. The generalized collision rate is then defined as the amount of collision actually occurring in n cycles, normalized by the maximum amount of collision that can occur in n cycles.

Figure 6:
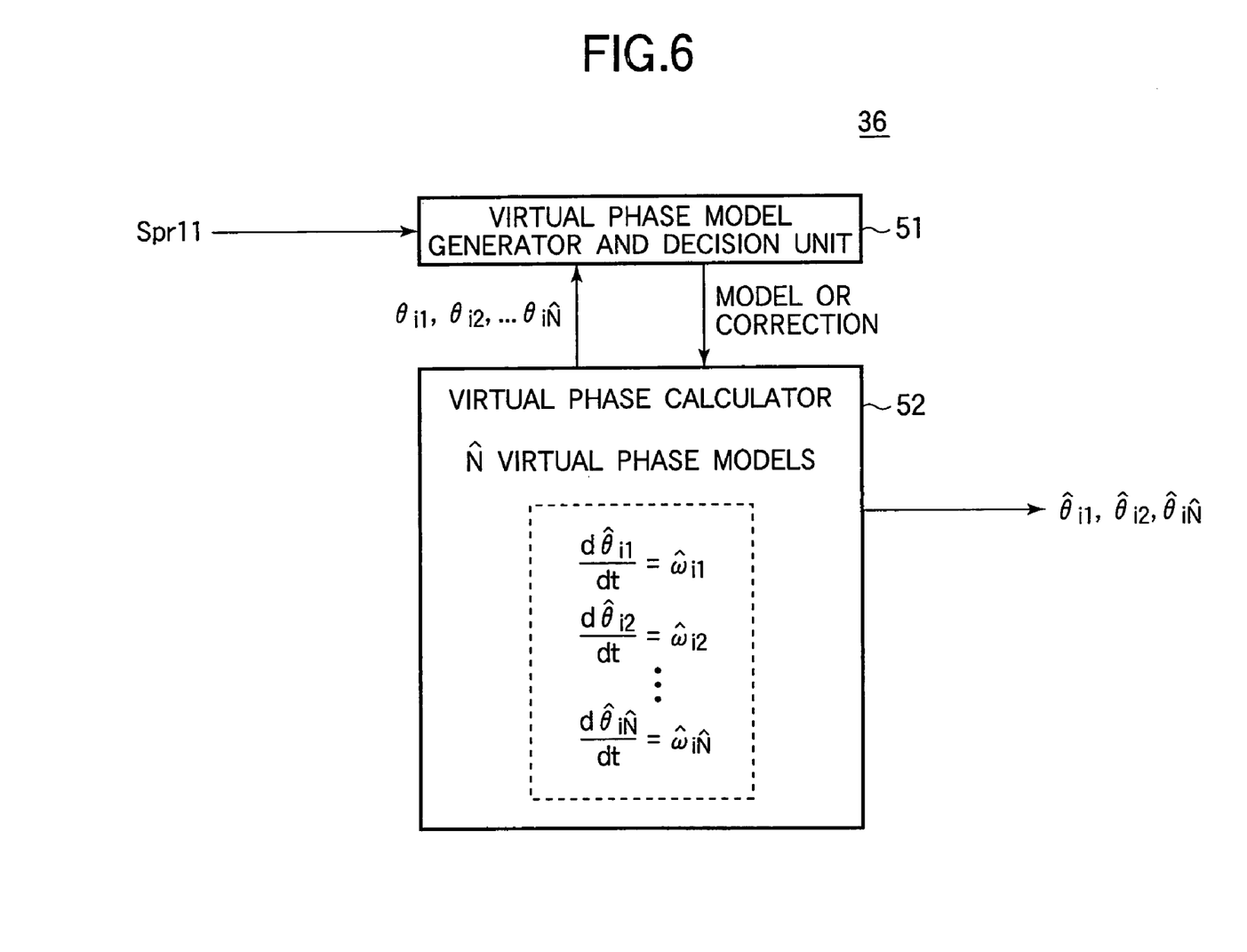
FIG. 6 is a functional block diagram of the virtual node model calculator in the second embodiment.

The collision rate calculator 32 in FIG. 6 calculates the collision rate $c_i(t)$ as defined either by equation (8) or by equation (9).

Next, a specific example of the phase response function $R(\Delta\Theta_{ij}(t))$ calculated in the phase calculator 31 will be described.

As discussed above, equation (2) represents a rule for temporally varying the nonlinear oscillation rhythm of node i in response to input of received impulse signals Spr11. The received impulse signals Spr11 correspond to the output impulse signals Sout11 transmitted from neighboring nodes. By operating according to equation (2), a set of neighboring nodes attempts to set up a mutually stable set of phase differences. In the first embodiment, the phase response function $R(\Delta\Theta_{ij}(t))$ has different characteristics depending on the collision rate $c_i(t)$. The phase response function characteristic determiner 35 in FIG. 4 executes the operation of altering the characteristic of the function $R(\Delta\Theta_{ij}(t))$ according to the collision rate $c_i(t)$ by executing the operation in equation (11) below).

The specific example of the phase response function $R(\Delta\Theta_{ij}(t))$ used in the first embodiment is given by formulas (10-1) to (10-4) and equation (11).

$$R(\Delta\Theta_{ij}(t)) = \alpha \cdot \left(\Delta\Theta_{ij}(t) - \frac{2\pi}{p}\right) \text{ if } \Delta\Theta_{ij}(t) \leq \frac{2\pi}{p} \qquad (10\text{-}1)$$

$$R(\Delta\Theta_{ij}(t)) = \qquad (10\text{-}2)$$
$$\beta(c_i(t)) \cdot \Delta\tilde{\Theta}_{ij}(t) \text{ if } \frac{2\pi}{p} < \Delta\Theta_{ij}(t) < 2\pi - p \text{ and } \Delta\tilde{\Theta}_{ij}(t) < \frac{\pi}{p}$$

$$R(\Delta\Theta_{ij}(t)) = \beta(c_i(t)) \cdot \left(\Delta\tilde{\Theta}_{ij}(t) - \frac{2\pi}{p}\right) \text{ if } \frac{2\pi}{p} < \qquad (10\text{-}3)$$
$$\Delta\Theta_{ij}(t) < 2\pi - p \text{ and } \Delta\tilde{\Theta}_{ij}(t) > \frac{\pi}{p}$$

$$R(\Delta\Theta_{ij}(t)) = \alpha \cdot \left(\Delta\Theta_{ij}(t) - \frac{(p-1)\pi}{p}\right) \text{ if } 2\pi - \frac{2\pi}{p} \leq \Delta\Theta_{ij}(t) \qquad (10\text{-}4)$$

$$\beta(c_i(t)) = b(1 - c_i(t))^2 \qquad (11)$$

The wave (~) notation in equations (10-2) and (10-3) indicates $\Delta(\Theta_{ij}(t))$ calculated modulo $2\pi/p$; that is, $\Delta(\Theta_{ij}(t))$ is divided by $2\pi/p$ and the remainder is taken.

Equations (10-1) to (10-4) and (11) define a phase response function $R(\Delta\Theta_{ij}(t))$ that attempts to establish uniform phase differences among neighboring nodes. The quantity p is a parameter that determines the uniform phase difference. That is, when a cycle is divided into p parts, each part subtends a phase angle of $2\pi/p$. The optimum value of p depends on the node arrangement, and can be determined experimentally. The phase angle $2\pi/p$ must be equal to or greater than the minimum phase with $\phi_c$ necessary for data transmission ($2\pi/p \geq \phi_c$). The quantities a and b are constant parameters that, like p, can be determined experimentally.

The phase response function $R(\Delta\Theta_{ij}(t))$ is of course not limited to the form given above. The invention can be practiced with various other functions that vary the phase of a node relative to the phase of a neighboring node according to the collision rate $c_i(t)$.

Next, a specific example of the stress response function $\xi(S_i(t))$ calculated by the processing executed successively in the cumulative stress calculator 33 and stress response function calculator 34 will be described. This exemplary stress response function $\xi(S_i(t))$ is defined by the following formulas (12-1), (12-2), (13-1), (13-2), and (14).

$$\xi(S_i(t)) = q(S_i(t)) \quad t = m \cdot n \cdot T_k \quad (12\text{-}1)$$

$$\xi(S_i(t)) = 0 \quad t \neq m \cdot n \cdot T_k (m = 1, 2, \ldots) \quad (12\text{-}2)$$

$$q(S_i(t)) = \mu \quad \text{with probability } S_i(t) \quad (13\text{-}1)$$

$$q(S_i(t)) = 0 \quad \text{with probability } 1 - S_i(t) \quad (13\text{-}2)$$

$$S_i(t) = \int_{t_k}^{t} s(c_i(\tau)) d\tau \quad (14)$$

The function $s(c_i(t))$ in equation (15) expresses the stress value for a collision rate $c_i(t)$ at time t. Various functions that indicate higher stress values as the collision rate $c_i(t)$ increases can be used. One class of examples includes the sigmoid function and other nonlinear functions in which the stress value rises steeply as the collision rate $c_i(t)$ increases.

The function $S_i(t)$ defined by equation (14) gives the cumulative stress at time t, that is, the value of the stress function $s(c_i(t))$ integrated over time. The interval over which the stress is accumulated starts at the time $t_s$ when the preceding random phase shift was executed in response to the cumulative stress value $S_i(t)$ and ends at time t. That is, the function $S_i(t)$ is reset when a random phase shift is executed, and starts accumulating stress again from that time. If the time t is given indiscrete form, the integration calculation can be carried out by taking the total sum of the stress values $s(c_i(t))$ at the individual discrete times. The cumulative stress calculator 33 calculates the cumulative stress $S_i(t)$.

The function $q(S_i(t))$ defined by formulas (13-1) and (13-2) returns a random number with a probability responsive to the cumulative stress $S_i(t)$. Specifically, it returns the value $\mu$ with probability $S_i(t)$, and the value zero with probability $1-S_i(t)$. The value $\mu$ is a random number on the interval $\epsilon \leq \mu < \delta$, where the values of $\epsilon$ and $\delta$ are constant parameters that should be determined experimentally.

The stress response function $\xi(S_i(t))$ evaluates the stress function $S_i(t)$ at intervals of n timing cycles and returns a random value ($\mu$ or 0) with a corresponding probability. The stress response function calculator 34 calculates the stress response function $\xi(S_i(t))$.

Accordingly, due to the introduction of the stress response function $\xi(S_i(t))$ into the nonlinear oscillation model in equation (2) above, (I) the cumulative stress function $S_i(t)$ is evaluated at intervals of n timing cycles, and (II) a random phase shift is executed with a probability based on the value of the cumulative stress function $S_i(t)$. The greater the accumulated stress value is, the higher the probability that a random phase shift will be executed becomes. At times other than integer multiples of n cycles, the value of the stress response function $\xi(S_i(t))$ is zero and a random phase shift is not executed. It should be noted that stress accumulation is not limited to n cycles; stress is accumulated over the interval from the time $t_s$ of the last preceding random phase shift to the present time t. Consequently, even when the stress value $s(c_i(t))$ is small, if it continues to accumulate for a sufficiently long time past n cycles, eventually the cumulative stress $S_i(t)$ will become large enough to lead to a random phase shift.

The phase calculator 31 uses the stress response function $\xi(S_i(t))$ to calculate the phase $\theta_i(t)$ defined in equation (2).

The communication timing calculator 12 that carries out the computations described above may be implemented in software, in hardware comprising a group of electronic circuits for executing mathematical operations, or in a combination of hardware and software.

For example, as means for executing the calculation shown in equation (2), a node may be provided with software for executing well-known numerical analysis methods such as the Runge-Kutta method. (For a Japanese description of the Runge-Kutta method, see *UNIX Wakusuteishon ni yoru Kagaku Gijutsu Keisan Handobukku—Kiso-hen C-gengo ban* (Handbook of Scientific and Engineering Computation on UNIX Workstations—Basic C Language Edition) by Hayato Togawa, published by Saiensu Co.) The Runge-Kutta method is one method of calculating changes in a state variable (calculating a time series) by using difference equations (recursion formulas) obtained from differential equations by converting a continuous time variable to discrete time. It is also possible to calculate changes in a state variable by use of difference equations obtained from differential equations by other methods of described in the above reference.

Also disclosed in Japanese Patent Application No. 2004-257562 and the first embodiment of Japanese Patent Application No. 2004-257567 are systems for performing communication timing control by using an impulse signal as an interaction signal and carrying out an operation based on a formula expressing a nonlinear oscillation model. In these systems, the phase relationship adjustment function that changes the oscillation rhythm of its own node in accordance with the phase difference (phase relationship) between the node and a neighboring node operates only when an impulse signal is received from the neighboring node. The phase relationship adjustment function thus operates at discrete timings when an impulse signal is received from a neighboring node.

According to the present invention, however, when an impulse signal is received from a neighboring node, a virtual phase model of the neighboring node is generated in the local node. The phase of the neighboring node is simulated by using the virtual phase model, enabling the difference between the phase of the local node and the simulated phase of the neighboring node to be continuously observed over a period of time. The phase relationship adjustment function that varies the oscillation rhythm of the local node according to the phase difference (phase relationship) between the local and neighboring nodes can then be executed continuously over a period of time. As a result, the operations that establish an optimum phase relationship between neighboring nodes become a smooth adjustment reflecting the phase relationship in real time, and the nodes can acquire time slots of substantially the same size.

As described above, in a data transmission method in which a plurality of nodes adjust their time slot assignments autonomously in a distributed manner by transmitting and receiving impulse signals, the first embodiment adds a virtual node model calculator to the internal structure of the communication timing calculator, whereby the process by which a group of neighboring nodes reaches an appropriate phase relationship becomes a smooth, continuous adjustment process reflecting the current phase relationship in real time, enabling the nodes to acquire time slots of substantially equal size. As a result, communication utilization efficiency is not impeded and communication can be carried out efficiently, even when each node generates considerable traffic.

SECOND EMBODIMENT

Next a communication control apparatus, communication control method, node, and communication system according to a second embodiment of the invention will be described.

The first embodiment makes no allowance for impulse signal reception errors. If the impulse signals are transmitted via radio channels (wireless communication), reception errors tend to occur with a probability depending on the distance between nodes. When an impulse signal reception error occurs, that is, when an input impulse signal Sin11 is not recognized as an impulse signal and is treated as noise, the first embodiment fails to form a virtual phase model for the transmitting node and cannot simulate the phase of that node during its next timing cycle. The number of virtual phase models active at any given time therefore tends to fluctuate, depending on the number of recent impulse signal reception errors. As a result, the capability of the virtual node model calculator to simulate the timing cycles of neighboring nodes is not fully used, and the effect of the invention in equalizing the lengths of the time slots is diminished.

The second embodiment allows for impulse signal reception errors by retaining virtual node models for more than one timing cycle. The second embodiment differs from the first embodiment only in the structure and operation of the virtual node model calculator. The structure and operation of the other constituent elements are the same as in the first embodiment.

Like the virtual node model calculator 36 in the first embodiment, the virtual node model calculator 36 in the second embodiment receives a received impulse signal Spr11, generates a virtual phase model of the neighboring node from which the impulse signal was received, and simulates the timing cycle of that node. Referring to FIG. 6, the virtual node model calculator 36 comprises a virtual phase model generator and decision unit 51 and a virtual phase calculator 52.

Upon receiving a received impulse signal Spr11, the virtual phase model generator and decision unit 51 first decides whether or not to generate a new phase model or correct one of the existing phase models already being used by the virtual phase calculator 52. This decision is made as follows. As in the first embodiment, each node is assumed to transmit an impulse signal at a predetermined fixed phase $\Psi$ (for example, $\Psi=0$).

(a) The virtual phase model generator and decision unit 51 takes the difference $\hat{\delta}_{ij}(t)$ between the predetermined phase $\Psi$ and the virtual phase $\Theta_{ij}(t)$ currently calculated by the virtual phase calculator 52 for each virtual phase model now in use (j=1, 2, ... N^i, where N^i is the total number of virtual phase models currently operating at node i). The relative phase difference $\hat{\delta}_{ij}(t)$ is calculated by an equation given later.

(b) The minimum value of the relative phase differences $\hat{\delta}_{ij}(t)$ (j=1, 2, ... N^i) obtained in (a) is found. The number u (u=1, 2, ... N^i) of the virtual phase model giving the minimum value of $\hat{\delta}_{ij}(t)$ is determined.

(c) If the minimum value obtained in (b) is less than a predetermined threshold parameter e (if $\hat{\delta}_{iu}(t)<e$), the phase $\Theta_{iu}(t)$ of the virtual phase model giving the minimum value is reset to phase $\Psi$. If the minimum value of the relative phase difference is greater than or equal to e (if $\hat{\delta}_{iu}(t) \geq e$), the virtual phase model generator and decision unit 51 generates a new virtual phase model and passes it to the virtual phase calculator 52. The initial phase of the newly added model is $\Psi$. The threshold parameter e is a constant parameter, the value of which can be determined experimentally.

The difference $\hat{\delta}_{ij}(t)$ is calculated as follows.

$$\rho_{ij}(t)=\Theta_{ij}(t)-\Psi \tag{15}$$

$$\text{If } \rho_{ij}(t) \leq \pi \text{ then } \hat{\delta}_{ij}(t)=\rho_{ij}(t) \tag{16-1}$$

$$\text{If } \rho_{ij}(t) > \pi \text{ then } \hat{\delta}_{ij}(t)=2\pi-\rho_{ij}(t) \tag{16-2}$$

For the sake of convenience, a modulo $2\pi$ value is taken by taking the remainder when divided by $2\pi$ of the sum of $\hat{\rho}_{ij}(t)$ and $2\pi$, bringing the value of $\hat{\rho}_{ij}(t)$ within the following range:

$$0 \leq \hat{\rho}_{ij}(t) < 2\pi$$

Processes (a) to (c) above can be expressed mathematically as follows:

$$u = \arg\min_{j \in Z_i}(\delta_{ij}(t)) \tag{17}$$

$$\text{If } \min_{j \in Z_i}(\delta_{ij}(t)) < e \text{ then } \Theta_{iu}(t) = \Psi \tag{18-1}$$

$$\text{If } \min_{j \in Z_i}(\delta_{ij}(t)) \geq e \text{ then } \Theta_{i(N^{\wedge}i+1)}(t) = \Psi \tag{18-2}$$

Zi represents the set of virtual phase models (j=1, 2, ... N^i) currently being used by the virtual phase calculator 52.

The operation of the virtual phase calculator 52 shown in FIG. 6 will be described next.

The virtual phase calculator 52 uses the same type of virtual phase models as in the first embodiment, but does not delete each virtual phase model after one timing cycle. Instead, the virtual phase calculator 52 of the second embodiment retains the virtual phase model for W cycles (W is a constant parameter) before deleting it. In the simplest case, W is a positive integer; the value of W can be determined experimentally.

As long as the simulated phase error of a given neighboring node remains less than the threshold parameter e, the virtual phase calculator 52 will maintain one virtual phase model for that neighboring node until the model is deleted at the end of W timing cycles. If the simulated phase error exceeds the threshold parameter e, a new virtual phase model may be generated, in which case the virtual phase calculator 52 may temporarily maintain two virtual phase models for the same node. Conversely, if two nodes transmit impulse signals separated by a time interval less than the threshold parameter e, the virtual phase calculator 52 may temporarily use the same virtual phase model to simulate both nodes. The virtual phase calculator 52 will therefore tend to simulate the timing phase of each neighboring node to within an accuracy of e, but the number of virtual phase models used may sometimes be more or less than the number of neighboring nodes from which impulse signals are received.

If the threshold parameter e is appropriately chosen, however, then in the steady state the virtual phase calculator 52 will usually maintain one virtual phase model per neighboring node, because the intervals between impulse signals will be greater than e, and because at about the time a virtual phase model is deleted at the end of W timing cycles, the node being simulated by the model will transmit a new impulse signal, from which a new virtual phase model will be generated.

Because each virtual phase model is retained for W timing cycles instead of just one timing cycle, fluctuations in the number of virtual phase models due to impulse signal reception errors are reduced by about a factor of W as compared with the first embodiment. Performance degradation caused by impulse signal reception errors can therefore be significantly lessened.

Accordingly, in a data communication system in which a plurality of nodes adjust their time slot assignments autonomously in a distributed manner by transmitting and receiving impulse signals, even in a noisy environment in which impulse signal reception errors occur frequently, the second embodiment enables a node to simulate the timing phases of all its neighboring nodes substantially continuously, so that timing adjustments can proceed smoothly. In the steady state, the second embodiment also enables a node to maintain substantially one virtual phase model per neighboring node, so that all nodes receive time slots of equal length. As a result, communication can be carried out efficiently even when each node generates considerable traffic in a noisy environment.

THIRD EMBODIMENT

Next a communication control apparatus, communication control method, node, and communication system according to a third embodiment of the invention will be described.

The impulse signals in the first and second embodiments were timing signals indicating only the phase state, and not the identity, of the transmitting node. In the third embodiment, a node identification number is added to each impulse signal to identify the transmitting node. Although this increases transmission overhead, it enables fluctuations in the number of virtual phase models maintained at a given node to be further reduced, and can particularly enhance the effect of the invention when impulse signal reception errors occur.

The third embodiment differs from the first and second embodiments only in regard to the internal structure and operation of the impulse signal transmitter and virtual node model calculator. The structure and operation of other constituent elements of the nodes are the same as in the first and second embodiments.

The impulse signal transmitter 13 differs from the impulse signal transmitter in the first and second embodiments in that it modulates identification information onto each transmitted impulse signal to identify the transmitting node.

The virtual node model calculator 36 operates in generally the same way as the virtual node model calculator in the second embodiment, except that it uses the node identifying information to manage the virtual phase models.

Figure 7:
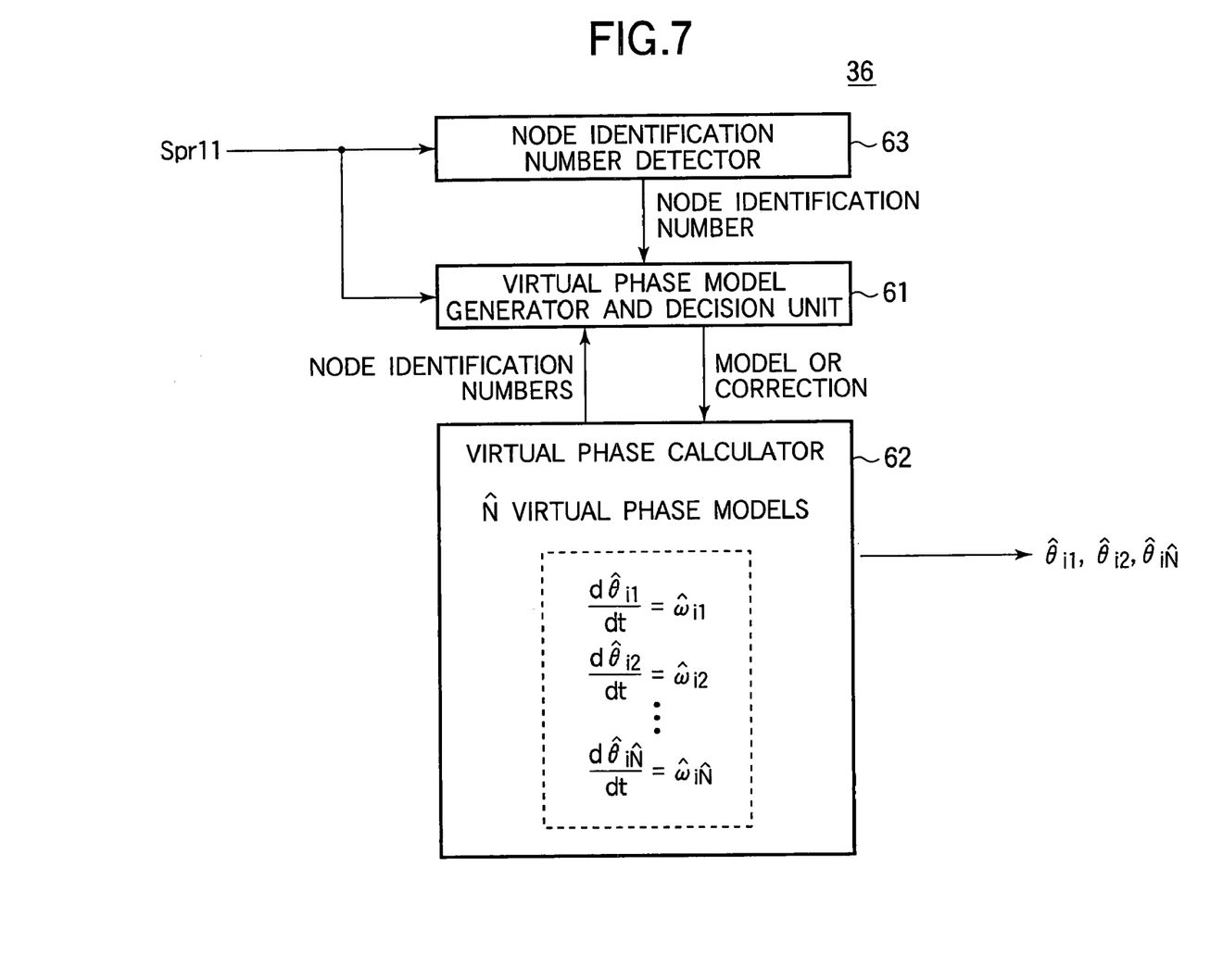
FIG. 7 is a functional block diagram of the virtual node model calculator in the third embodiment.

Referring to the functional block diagram in FIG. 7, the virtual node model calculator 36 in the third embodiment comprises a virtual phase model generator and decision unit 61, a virtual phase calculator 62, and a node identification number detector 63.

When an impulse signal is received from a node, the node identification number detector 63 detects the node identification number of the node and sends the detected node identification number to the virtual phase model generator and decision unit 61.

The virtual phase model generator and decision unit 61 uses the node identification number to decide whether to generate a new virtual phase model or correct an existing virtual phase model. Specifically, the virtual phase model generator and decision unit 61 carries out the following procedure. As in the preceding embodiments, each node is assumed to transmit an impulse signal at the same timing phase $\Psi$ (e.g., $\Psi=0$)

(a) The virtual phase model generator and decision unit 61 checks whether any virtual phase model currently in use by the virtual phase calculator 62 has the same node identification number as the node identification number detected from the received impulse signal.

(b) If there is a virtual phase model j having the same node identification number, the phase $\Theta_{ij}(t)$ of that model is corrected to phase $\Psi$. If there is no such model, a new virtual phase model is generated and passed to the virtual phase calculator 62. This new model is given an initial phase $\Psi$ and is assigned the node identification number detected from the impulse signal.

The virtual phase calculator 62 executes computations for simulating the timing phases of neighboring nodes, using the virtual phase models received from the virtual phase model generator and decision unit 61. Each virtual phase model is retained for W cycles, where W is a constant parameter, and then deleted, as in the second embodiment. In the simplest case, W is a positive integer, but W may also be set to slightly less than an integer value, to assure that in the steady state, each virtual phase model is deleted shortly before an impulse signal is received from the corresponding neighboring node. This enables the virtual phase calculator 62 to maintain one virtual phase model per node substantially all of the time in the steady state, and most of the time even in transitional states leading up to the steady state. The best value of W may be determined experimentally.

Like the second embodiment, the third embodiment enables a node to simulate the timing phases of all its neighboring nodes substantially continuously, even in a noisy environment in which impulse signal reception errors occur frequently. By assigning node identification numbers to the virtual phase models, the third embodiment enables a one-to-one correspondence to be established between virtual phase models and neighboring nodes, so that a node never uses two or more virtual phase models for the same neighboring node, or uses the same virtual phase model to simulate two or more neighboring modes. Compared with the second embodiment, fluctuations in the number of virtual phase models are further reduced, mutual interactions can be calculated with greater stability, and a steady state in which interacting nodes have time slots of equal length can be reached more quickly.

Accordingly, in a data communication system in which a plurality of nodes adjust their time slot assignments autonomously in a distributed manner by transmitting and receiving impulse signals, even in a noisy environment in which impulse signal reception errors occur frequently, the third embodiment enables a node to simulate the timing phases of all its neighboring nodes substantially continuously with one virtual phase model per neighboring node. Consequently, interactions remain stable and timing adjustments can proceed quickly and smoothly to a steady state in which all interacting nodes receive time slots of substantially equal length. As a result, network utilization efficiency is not impeded by noise, and communication can be carried out efficiently, even when each node generates considerable traffic.

The invention is not limited to the preceding embodiments; the following variations are also contemplated.

The way in which nodes transmit and receive impulse signals is not limited, provided it permits timing information to be conveyed between nodes. The simplest types of impulse signals are isolated pulses with a square waveshape or a Gaussian waveshape. An impulse signal need not, however, consist only of a single pulse; an impulse signal may comprise a plurality of pulses. For example, a pulse string expressing a predetermined bit pattern may be used as an impulse signal. This type of impulse signal is useful in a noisy environment in which a single pulse signal might be difficult to recognize. The term 'impulse signal' as used herein refers conceptually to a signal that indicates a particular timing, regardless of the form taken by the impulse signal.

In the third embodiment, in which the impulse signals include node identification numbers, the node identification numbers may be modulated onto the impulse signals in various ways, such as on-off keying, frequency-shift keying, phase-shift keying, and so on. An impulse signal may also be transmitted as a very short packet with the node identification number as its data payload.

The natural angular frequency parameter $\omega_i$ need not have a fixed uniform value throughout the system. The system can operate with a different value of $\omega_i$ at each node. For example, the values of $\omega_i$ at the nodes may lie near a central value around which they are distributed according to a Gaussian probability distribution.

A differential equation (2) was used to describe the processing performed by the communication timing controller 12, but other types of equations can be used instead. One example is a difference equation or recursion formula obtained by changing the continuous time variable t in equation (2) to a discrete time variable as shown below.

$$\theta(u+1) = \theta(u) + \left[\omega_i + \sum_{j=1}^{N} P_i(u) \cdot R(\Delta\Theta_{ij}(u)) + \xi(S_i(u))\right] \cdot \Delta t \quad (19)$$

$$u = 0, 1, 2, \ldots$$

$\Delta t$: discrete time step width

In the equation above, u is a discrete time variable taking on positive integer values. The other symbols have the same meanings as in the first embodiment, except that they are all functions of the discrete time variable U. The quantity $\Delta t$ indicates the step width of discrete time. The continuous time variable t and the discrete time variable u are related by $\Delta t$ (more specifically, t=u·$\Delta t$). Equation (18) indicates how the phase $\theta_i(u)$ at time u is used to calculate the phase $\theta_i(u+1)$ at the next time u+1.

In the equation above, only the time axis is treated in discrete steps, but it is also possible to have the state variables take on discrete values. That is, the state variables can be quantized. In this case, the phase signal $\theta_i(t)$ is quantized and takes on M discrete values, where M is a positive integer. In the equation below, quantization is expressed by a quantizing function quan(*) that converts an arbitrary continuous quantity (*) to an integer by dividing the quantity by a quantization step width w and ignoring the remainder. The quantization step width w is equal to the dynamic range of the quantity (*) divided by M. For the phase signal $\theta_i(t)$, the quantization step width w is equal to $2\pi/M$.

$$\theta(u+1) = \theta(u) + quan\left(\left[\omega_i + \sum_{j=1}^{N} P_i(u) \cdot R(\Delta\Theta_{ij}(u)) + \xi(S_i(u))\right] \cdot \Delta t\right) \quad (20)$$

$$u = 0, 1, 2, \ldots$$

$\Delta t$: discrete time step width

Equation (2) was shown in the first and second embodiments as a formula for modeling nonlinear oscillation, but as noted above, other descriptions of nonlinear oscillation can be used. For example, it is possible to use the well-known van der Pool equation and other general models of nonlinear oscillation or chaotic oscillation, regardless of whether the mutual interactions between nodes take place continuously or at discrete intervals. (For a Japanese discussion of the van der Pool equation, see Toda et al., *Hisenkei Rikigaku* (Nonlinear Dynamics), Kyoritsu Shuppan.) The van der Pool equation models nonlinear oscillatory phenomena in electronic circuits. Although this model can be incorporated into the present invention by providing hardware circuits that actually exhibit the modeled oscillations, the model can also be incorporated in software by using general methods of numerical analysis, such as the Runge-Kutta method.

The present invention does not depend on the particular nonlinear oscillatory behavior that is modeled or the particular mathematical expression of the model. Time and operating states may be treated as discrete or continuous variables, and interactions may take place continuously or at discrete intervals. Operating states may vary periodically or chaotically.

In the preceding embodiments, the neighboring nodes interacted by wireless communication, but the invention is not limited to wireless communication. The invention can also be practiced in a system in which a number of spatially distributed nodes exchange data over wires. For example, the invention can be applied to a wired local area network (LAN) such as an Ethernet network (Ethernet is a registered trademark), or a wired network linking a mixture of different types of nodes, such as sensor nodes, actuator nodes, or server nodes. The invention may also be practiced in a network in which wired connections and wireless connections are mixed.

The present invention can also be used as a communication protocol for exchanging routing tables between routers at different timings on the Internet. A router is a relay node device that routes information to its destination on a network by selecting communication paths. A routing table is essentially a communication path selection rule referred to when information is routed. To achieve efficient communication, it is necessary to keep updating the routing tables in response to changes in network topology, local traffic conditions, and so on. Each router therefore periodically transmits routing table information to the other routers in the network.

As shown by Floyd et al. in "The Synchronization of Periodic Routing Messages", *IEEE/ACM Transactions on Networking*, Vol. 2, No. 2, pp. 122-136, April 1994, even though different routers transmit their routing tables independently, these transmissions have a tendency to become mutually synchronized. Floyd et al. propose a method of avoiding synchronization by imposing random variability on the period between routing table transmissions, and this method is shown to produce some effect. Because the method depends only on randomness, however, an undesirably high degree of randomness is required to achieve even a modest effect.

If the present invention is applied to the transmission of routing tables, neighboring routers can adjust the time slots in which they transmit routing tables autonomously among themselves, so that different routers transmit routing tables at different times. Because the routers actively avoid each other's time slots, the method of the present invention achieves a greater effect than the method proposed by Floyd et al., while requiring less randomness.

The invention can be used to avoid collision or synchronization in all types of networks, whether wireless or wired, and it can be used as a communication protocol for achieving efficient data communication possessing with both adaptability and stability.

The present invention is characterized by its acquisition and control of communication timing information (the phase signal in the embodiments), without regard to the use that is made of the timing information. If different nodes transmit data signals at different frequencies, for example, they can communicate without set time slots, but even in this case they may use the communication timing information to determine when to initiate data communication.

The form of the phase response function is not limited to the exemplary function $R(\Delta\theta_{ij}(t))$ used in the first and second embodiments. Other types of phase response functions can be used instead.

In the first and second embodiments, the phase response function $R(\Delta\theta_{ij}(t))$ was defined by combining different functions of the phase difference $\Delta\theta_{ij}(t)$, some of which included functions of the collision rate $c_i(t)$ as stress response values, but the phase response function $R(\Delta\theta_{ij}(t))$ can be defined by combining different functions of the phase difference $\Delta\theta_{ij}(t)$ alone, without including a response to the collision rate $c_i(t)$.

Of the many variations shown in the specifications and drawings of Japanese Patent Applications No. 2003-328530, No. 2004-257562, and No. 2004-257567, which are related to the present application, those variations that are applicable to the present invention are included herein by reference.

Those skilled in the art will recognize that further variations are possible within the scope of the present invention, which is defined in the appended claims.

What is claimed is:

1. A communication control apparatus installed in a node within a plurality of nodes constituting a communication system, the communication control apparatus including a communication timing calculator for determining timings of data transmission from the node according to a timing cycle represented by variations in a phase state internal to the node, the communication timing calculator comprising:
    a virtual node calculator for simulating the timing cycle of a neighboring node by calculating virtual phase states of the neighboring node according to reception of a state variable signal from the neighboring node, the state variable signal representing a particular internal phase state of the neighboring node, the virtual node comprising hardware or a combination of hardware and software; and
    a phase calculator for varying the internal phase state of the node according to a predetermined time series rule, based on the virtual phase states of the neighboring node calculated by the virtual node calculator, the phase calculator comprising hardware or a combination of hardware and software.

2. The communication control apparatus of claim 1, wherein the virtual node calculator, upon receiving the state variable signal from the neighboring node, generates a virtual phase model in the node and uses the virtual phase model to calculate the virtual phase states of the neighboring node.

3. The communication control apparatus of claim 2, wherein the virtual phase model generated by the virtual node calculator represents an oscillatory phenomenon in which the virtual phase of the neighboring node changes at a fixed rhythm determined by a natural frequency parameter.

4. The communication control apparatus of claim 2, wherein the virtual node calculator uses the generated virtual phase model for one simulated timing cycle of the neighboring node, then deletes the generated virtual phase model.

5. The communication control apparatus of claim 2, wherein the virtual node calculator uses the generated virtual phase model for a plurality of simulated timing cycles of the neighboring node, then deletes the generated virtual phase model.

6. The communication control apparatus of claim 5, wherein the virtual node calculator takes a phase difference between a simulated phase calculated from an existing virtual phase model and the particular phase of the neighboring node indicated by the state variable signal, generates a new virtual phase model of the neighboring node if the phase difference exceeds a predetermined threshold value, and modifies the phase state of the existing virtual phase model if the phase difference is less than the predetermined threshold value.

7. The communication control apparatus of claim 1, further comprising a node identifying information detector for detecting node identifying information included in the state variable signal received from the neighboring node, wherein the virtual node calculator manages virtual phase models of different neighboring nodes according to the node identifying information detected by the node identifying information detector.

8. The communication control apparatus of claim 1, wherein the communication timing calculator further comprises:
    a collision rate calculator for observing a phase difference between the node and the neighboring node and calculating therefrom a collision rate representing a rate of collision between timings of data transmission from the node and timings of data transmission from the neighboring node;
    a stress response function generator that integrates a stress value responsive to the collision rate over time, and causes a phase shift of random size in the time series rule used by the phase calculator responsive to the integrated stress value; and
    phase response function characteristic determiner for altering characteristics of the time series rule according to the collision rate.

9. A node within a plurality of nodes constituting a communication system, said node including a communication control apparatus including a communication timing calculator for determining timings of data transmission from the node according to a timing cycle represented by variations in a phase state internal to the node, the communication timing calculator comprising:
    a virtual node calculator for simulating the timing cycle of a neighboring node by calculating virtual phase states of the neighboring node according to reception of a state variable signal from the neighboring node, the state variable signal representing a particular internal phase state of the neighboring node, the virtual node comprising hardware or a combination of hardware and software; and
    a phase calculator for varying the internal phase state of the node according to a predetermined time series rule, based on the virtual phase states of the neighboring node calculated by the virtual node calculator, the phase calculator comprising hardware or a combination of hardware and software.

10. A communication system including a plurality of nodes, each of said nodes including a communication control apparatus including a communication timing calculator for determining timings of data transmission from the node according to a timing cycle represented by variations in a phase state internal to the node, the communication timing calculator comprising:
    a virtual node calculator for simulating the timing cycle of a neighboring node by calculating virtual phase states of the neighboring node according to reception of a state variable signal from the neighboring node, the state variable signal representing a particular internal phase state of the neighboring node, the virtual node comprising hardware or a combination of hardware and software; and
    a phase calculator for varying the internal phase state of the node according to a predetermined time series rule, based on the virtual phase states of the neighboring node calculated by the virtual node calculator, the phase calculator comprising hardware or a combination of hardware and software.

11. A communication control method employed in a first node within a plurality of nodes constituting a communication system to determine timings of data transmission from the first node according to a timing cycle represented by variations in a phase state internal to the first node, the method comprising:

simulating, with a communication control apparatus comprising hardware at the first node, the timing cycle of a second node by calculating virtual phase states of the second node according to reception of a state variable signal from the second node, the state variable signal representing a particular internal phase state of the second node; and varying, with the communication control apparatus, the internal phase state of the first node according to a predetermined time series rule, based on the calculated virtual phase states of the second node.

12. The communication control method of claim 11, wherein simulating the timing cycle includes:

generating, with the communication control apparatus, a virtual phase model of the second node upon reception of the state variable signal from the second node; and using the virtual phase model to calculate, with the communication control apparatus, the virtual phase states of the second node.

13. The communication control method of claim 12, wherein the virtual phase model represents an oscillatory phenomenon in which the virtual phase of the second node changes at a fixed rhythm determined by a natural frequency parameter.

14. The communication control method of claim 12, wherein the virtual phase model is used to calculate the virtual phase state of the second node for one simulated timing cycle of the second node, further comprising deleting the virtual phase model after the one simulated timing cycle.

15. The communication control method of claim 12, wherein the generated virtual phase model is used for a plurality of simulated timing cycles, further comprising deleting the virtual phase model after the plurality of simulated timing cycles.

16. The communication control method of claim 15, further comprising:

taking, with the communication control apparatus, a phase difference between a simulated phase calculated from an existing virtual phase model and the particular phase of the second node indicated by the state variable signal;

generating, with the communication control apparatus, a new virtual phase model of the second node if the phase difference exceeds a predetermined threshold value; and modifying, with the communication control apparatus, the phase state of the existing virtual phase model if the phase difference is less than the predetermined threshold value.

17. The communication control method of claim 11, further comprising:

detecting, with the communication control apparatus, node identifying information included in the state variable signal received from the second node; and managing, with the communication control apparatus, the virtual phase model of the second node according to the node identifying information.

18. The communication control method of claim 11, further comprising:

observing, with the communication control apparatus, a phase difference between the first node and the second node and calculating therefrom a collision rate representing a rate of collision between timings of data transmission from the first node and timings of data transmission from the second node;

integrating, with the communication control apparatus, a stress value responsive to the collision rate over time;

causing, with the communication control apparatus, a phase shift of random size in the time series rule responsive to the integrated stress value; and altering, with the communication control apparatus, characteristics of the time series rule according to the collision rate.

* * * * *